(12) United States Patent
Rutelin et al.

(10) Patent No.: US 12,384,321 B2
(45) Date of Patent: Aug. 12, 2025

(54) AIRBAG MODULE FOR A VEHICLE, VEHICLE COMPRISING AN AIRBAG MODULE, USE OF AN AIRBAG MODULE AND METHOD FOR PROTECTING AN OCCUPANT BY A COLLISION USING AN AIRBAG MODULE

(71) Applicant: Volvo Car Corporation, Gothenburg (SE)

(72) Inventors: Sebastian Rutelin, Gothenburg (SE); Johan Rosenberg, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 18/647,562

(22) Filed: Apr. 26, 2024

(65) Prior Publication Data
US 2024/0375604 A1 Nov. 14, 2024

(30) Foreign Application Priority Data

May 8, 2023 (EP) ..................................... 23172073

(51) Int. Cl.
*B60R 21/233* (2006.01)
(52) U.S. Cl.
CPC .. *B60R 21/233* (2013.01); *B60R 2021/23308* (2013.01)
(58) Field of Classification Search
CPC ....... B60R 21/06; B60R 21/08; B60R 21/206; B60R 21/23184; B60R 21/232; B60R 21/233; B60R 2021/23107; B60R 2021/23153; B60R 2021/23169; B60R 2021/23308; B60R 2021/23316; B60R 2021/23324
See application file for complete search history.

(56) References Cited

U.S. PATENT DOCUMENTS 3,731,949 A * 5/1973 Radke .................... B60R 21/232
182/138
3,747,952 A * 7/1973 Graebe ................. B60R 21/205
137/67

(Continued)

FOREIGN PATENT DOCUMENTS

JP 2008207661 A * 9/2008
JP 2016030545 A 3/2016

(Continued)

OTHER PUBLICATIONS

Extended European Search Report for European Patent Application No. 23172073.1 dated Oct. 17, 2024, 7 pages.

(Continued)

*Primary Examiner* — Laura Freedman
(74) *Attorney, Agent, or Firm* — Amin, Turocy & Watson, LLP (57) ABSTRACT

The disclosure relates to an airbag module for a vehicle. The airbag module can comprise a first cushion unit and a second cushion unit comprising a plurality of cushion cells. The plurality of cushion cells can be arranged adjacent to each other. The plurality of cushion cells of the second cushion unit can be arranged at the first cushion unit and can be configured to cover a region of the airbag module, and the region can be arranged to face an occupant and be in contact with the occupant during a collision.

20 Claims, 4 Drawing Sheets

(56) References Cited

U.S. PATENT DOCUMENTS

| | | | | |
|---|---|---|---|---|
| 7,040,653 B1 * | 5/2006 | Breed | | G06F 30/15 |
| | | | | 280/731 |
| 7,195,276 B2 * | 3/2007 | Higuchi | | B60R 21/231 |
| | | | | 280/743.1 |
| 7,264,269 B2 * | 9/2007 | Gu | | B60R 21/232 |
| | | | | 280/730.2 |
| 7,922,190 B2 * | 4/2011 | Sugimoto | | B60R 21/233 |
| | | | | 280/736 |
| 7,922,193 B2 * | 4/2011 | Breuninger | | B60R 21/2338 |
| | | | | 280/730.2 |
| 8,408,350 B2 * | 4/2013 | Wilmot | | B60R 21/36 |
| | | | | 180/274 |
| 8,573,634 B2 * | 11/2013 | Choi | | B60R 21/232 |
| | | | | 280/730.2 |
| 8,579,321 B2 * | 11/2013 | Lee | | B60R 21/233 |
| | | | | 280/729 |
| 9,533,651 B1 * | 1/2017 | Ohno | | B60N 2/914 |
| 9,950,687 B2 * | 4/2018 | Kato | | B60R 21/233 |
| 10,005,417 B2 * | 6/2018 | Ohno | | B60R 21/2334 |
| 10,029,643 B2 * | 7/2018 | Spahn | | B60R 21/239 |
| 10,065,592 B2 * | 9/2018 | Jaradi | | B60R 21/214 |
| 10,336,280 B2 * | 7/2019 | Faruque | | B60R 21/233 |
| 10,471,923 B2 * | 11/2019 | Jimenez | | B60R 21/2338 |
| 10,703,320 B2 * | 7/2020 | Farooq | | B60R 21/231 |
| 11,505,155 B1 * | 11/2022 | Faruque | | B60R 21/2338 |
| 11,760,300 B1 * | 9/2023 | Jaradi | | B60R 21/026 |
| | | | | 280/743.2 |
| 11,840,190 B1 * | 12/2023 | Swiniarski | | B60R 21/232 |
| 11,975,672 B2 * | 5/2024 | Oh | | B60R 21/233 |
| 2005/0189743 A1 * | 9/2005 | Bakhsh | | B60R 21/232 |
| | | | | 280/730.2 |
| 2009/0218798 A1 * | 9/2009 | Garner | | B60R 21/233 |
| | | | | 280/742 |
| 2013/0088056 A1 * | 4/2013 | Quatanens | | B60R 21/231 |
| | | | | 297/216.13 |
| 2020/0062210 A1 * | 2/2020 | Fukawatase | | B60R 21/231 |
| 2020/0384939 A1 | 12/2020 | Rutgersson et al. | | |
| 2023/0027656 A1 | 1/2023 | Moran et al. | | |

FOREIGN PATENT DOCUMENTS

| | | | |
|---|---|---|---|
| JP | 2021098434 A | * | 7/2021 |
| WO | 2008059719 A1 | | 5/2008 |
| WO | 2012144748 A2 | | 10/2012 |
| WO | 2012144748 A3 | | 1/2013 |

OTHER PUBLICATIONS

Communication pursuant to Article 94(3) EPC received for EP Patent Application Serial No. 23172073.1 dated Nov. 21, 2024, 5 pages.

* cited by examiner

AIRBAG MODULE FOR A VEHICLE, VEHICLE COMPRISING AN AIRBAG MODULE, USE OF AN AIRBAG MODULE AND METHOD FOR PROTECTING AN OCCUPANT BY A COLLISION USING AN AIRBAG MODULE

CROSS REFERENCE TO RELATED APPLICATIONS

This application claims the benefit of and priority to pending EP patent application serial number 23172073.1, filed May 8, 2023, and entitled "AIRBAG MODULE FOR A VEHICLE, VEHICLE COMPRISING AN AIRBAG MODULE, USE OF AN AIRBAG MODULE AND METHOD FOR PROTECTING AN OCCUPANT BY A COLLISION USING AN AIRBAG MODULE," the entirety of which is hereby incorporated by reference herein.

TECHNICAL FIELD

The present disclosure relates to vehicles and, more particularly, to protection of an occupant from a collision with an airbag module for a vehicle.

SUMMARY

The present disclosure relates to an airbag module for a vehicle, a vehicle comprising an airbag module, use of an airbag module for a vehicle for protecting an occupant by a collision and a method for protecting an occupant by a collision by means of an airbag module for a vehicle.

Interior designs for future vehicles may focus on offering more roominess for occupants. To offer more roominess for occupants, there exists a need to fill more space with an airbag protection system during crashing events of the vehicles, in particular, when a limited packaging space is available for the airbag protection system.

It is an objective of the present disclosure to provide an improved airbag protection system for a vehicle.

The problem is at least partially solved or alleviated by the subject matter of the independent claims of the present disclosure, wherein further examples are incorporated in the dependent claims.

According to a first aspect, there is provided an airbag module for a vehicle. The airbag module comprises a first cushion unit and a second cushion unit that comprises a plurality of cushion cells. The plurality of cushion cells are arranged adjacent to each other. Further, the plurality of cushion cells of the second cushion unit are arranged at the first cushion unit and configured to cover a region of the airbag module, which is arranged to face an occupant and be in contact with the occupant during a collision.

The second cushion unit comprising the plurality of cushion cells, which may be arranged close to each other, may be designed to be in direct contact with the occupant or a body part of the occupant, such as a knee of the occupant, at the region by the collision. As such, the plurality of cushion cells may form an intermediate layer between the first cushion unit and the occupant or the body part of the occupant, when the vehicle crash or collision may occur. The plurality of cushion cells may add the stiffness to the whole airbag module on its outer contact surface at the region, which may be designed to restrain the occupant while being in contact with the occupant.

By arranging the plurality of cushion cells of the second cushion unit at the region, the need for increasing the volume of a conventional airbag module, which may comprise a single cushion unit and by which both the cushion size of the single cushion unit and an inflator power may be required to be increased to restrain the occupant in the event of the collision with the vehicle, may be reduced. Further, the plurality of cushion cells may advantageously enable reducing or at least maintaining the needed volume for packaging or integrating the airbag module while maintaining the restraining performance in an interior of the vehicle which may be designed to provide more roominess for the occupant. In contrast, the conventional airbag module may require more packaging space for integrating the conventional airbag module in the vehicle, if the cushion size of the only cushion unit and the inflator power may be increased in accordance with the increased roominess of the vehicle in order to maintain a sufficient pressure in the cushion while the collision.

According to an example, the first cushion unit may be a substantially U-shaped body member that may comprise a chamber with a chamber volume and a pair of arms.

Alternatively, by arranging the second cushion unit with the plurality of cushion cells in addition to the first cushion unit, the stiffness may be reduced locally. As such, the rest of the cushion, i.e., the first cushion unit may have a lower nominal pressure in the chamber and/or a redefined or smaller shape, e.g., the U-shape of the body member. In this way, the total internal volume of the airbag module and/or the packing volume for integrating such an airbag module in the vehicle may be reduced or at least may not have to increase, so that more roominess inside the vehicle may be provided for the occupant. At the same time, however, the total airbag module may still be able to offer a satisfactory restraining performance in the event of a collision.

According to an example, the first cushion unit may comprise an aperture, and the second cushion unit is arranged to cover the aperture of the first cushion unit.

For example, the aperture may be arranged in the middle or central region of the first cushion unit, so that the first cushion may be designed to be substantially symmetrical, and the first cushion may remain substantially symmetrical when the occupant is in contact with the airbag module during the collision. As such, the total internal volume of the airbag module and/or the packing volume for integrating such an airbag module in the vehicle may be reduced.

According to a further example, each of the plurality of cushion cells is designed to be tube shaped. Additionally, each of the plurality of cushion cells is arranged at and/or connected to the pair of arms of the first cushion unit.

By arranging the cushion cells at or on top of the first cushion unit and by fixing the cushion cells of the second cushion to the first cushion unit, in particular, to the pair of arms of the U-shaped first cushion unit, the aperture of the first cushion unit may be covered and protected by the cushion cells, since the cushion cells may be designed to be an additional and/or intermediate layer between the first cushion and the occupant during the collision.

According to a further example, the first cushion unit and/or the second cushion unit may be designed to be inflatable.

The first cushion unit and/or the second cushion unit may be designed to be inflated, for example, from a stowed position when being packaged in the vehicle to a deployed position at which the first cushion unit and/or the second cushion unit may have, respectively, a length and a thickness to protect the occupant by the collision.

According to a further example, each of the plurality of cushion cells may comprise a cell chamber. The cell chamber may comprise a cell chamber volume when being filled with an inflating gas.

The cell chamber volume of each of the plurality of cushion cells may be designed as a separate volume to the chamber of the body member of the first cushion unit. The cell chamber volume of all cushion cells may form a total cell chamber volume as a predefined inner cell volume. Moreover, the cell chamber volume of each cell chamber may be smaller than the chamber volume of the chamber of the first cushion unit. Accordingly, each of the plurality of cushion cells may be designed to be thin but able to cover the region of the airbag module when being in contact with the occupant during a collision. The total separate volume may thus consist of the separate cell chamber volume of all cell chambers of the plurality of cushion cells.

According to a further example, the plurality of cushion cells may be configured to allow the region of the airbag module to be deformed over a predefined distance by the collision.

Additionally, or alternatively, the plurality of cushion cells may be configured to allow compressing the chamber of the first cushion unit by a reduced chamber volume and/or compressing the cell chamber of each of the plurality of cushion cells of the second cushion unit by a reduced cell chamber volume during the collision.

For example, when a force as a result of the collision may be applied to the airbag module with the total inner volume consisting of the chamber volume and the total cell chamber volume of the plurality of cushion cells, the chamber volume and/or the cell chamber volume of the plurality of cushion cells may vary in response to a respective degree of compression. The amount of the compression may be achieved, for example, depending on the internal pressure of the airbag module, the force applied on the airbag module and/or the area or region acting on the airbag module by the collision. For example, the factors may affect the compression during a collision as follows:

A higher internal pressure of the airbag module may result in a lower degree of compression;

A higher force applied on the airbag module may result in a higher degree of compression; and/or A larger region acting on the airbag module may result in a lower degree of compression.

The separate, total cell chamber volume of the plurality of cushion cells may create a semi-rigid surface at the region between the occupant and the rest parts of the airbag module. This may lead to an increased contact surface between the airbag module and the occupant at the region during the collision. If the force applied on the airbag module, which may be given by the energy from the occupant lading into airbag module during a collision, may be considered to be constant, the increased contact surface may result in a reduced compression of the airbag module, in particular, a reduced change in the collision distance with the predefined distance, the reduced change in the internal pressure inside the airbag module, the reduced chamber volume and/or the reduced cell chamber volume during the collision.

According to a further example, the airbag module may further comprise an inflator, which may be configured to produce the inflating gas for filling the first cushion unit and/or the plurality of cushion cells of the second cushion unit.

It may alternatively be provided that the total internal volume of the airbag module may not have to increase by arranging the cushion cells of the second cushion unit in addition to the first cushion unit while increasing the roominess inside the vehicle. Also, with the same design of the airbag module, the inflator may not need to be designed to be more powerful or may not have to increase in size. Alternatively, the inflator may even be designed to be more compact, so that there may be potential to reduce the total packaging volume for the complete airbag module.

Moreover, the airbag module may be provided with a lower internal pressure by filling in the inflating gas using the inflator, for example into the chamber of the first cushion unit and/or into the cell chamber of each of the plurality of cushion cells of the second cushion unit compared to the conventional airbag module having the single airbag cushion unit. The lower internal pressure in the airbag module may offer the same level of restraining performance. Also, there may be no need for increasing the power of the inflator when increasing the total inner volume with the separate and additional inner cell chamber volume of the plurality of cushion cells. Alternatively, it may be possible to decrease the inflator power when having the inner total volume of the airbag module, in particular the chamber volume of the first cushion unit, intact.

Further, as the shape of the first cushion unit may be redefined or minimized, the total size of the airbag module may be decreased. However, the level of restraining the performance by the collision may still be offered in areas where the airbag module, in particular the first cushion unit, may be drastically redefined or minimized to a degree where a large portion, such as the aperture of the first cushion unit, may be removed.

In total, the airbag module may be decreased, designed to be more compact, or at least maintained even though more total inner volume of the inflating gas may need to be filled by means of the inflator, respectively, into the chamber of the first cushion unit and all cell chambers of the plurality of cushion cells of the second cushion unit.

According to a further example, the first cushion unit may comprise a first port. The first port may be connected to the inflator and configured to allow the inflator to fill the chamber volume of the chamber with the inflating gas.

For example, if the first cushion may be designed to comprise the substantially U-shaped body member and the pair of arms, the first port may be arranged at the body member or at the pair of arms. However, the first port may be arranged in the middle area of first cushion unit or the body member, so that the inflating gas may be filled into the whole chamber volume of the first cushion unit in a short time.

According to a further example, the cell chamber may comprise a second port. The second port may be connected to the inflator and configured to allow the inflator to fill the cell chamber volume of cell chamber of the plurality of cushion cells.

The second port may be provided separately, for example at a distance, to the first port. In other words, the second port may be connected to the inflator, independently from the connection between the inflator and the first port.

According to a further example, the plurality of cushion cells may be interconnected with each other, so that the cell chamber of each of the plurality of cushion cells can be filled with the inflating gas by means of the second port.

In other words, the second port may be designed as a common port for filling all cell chambers of the plurality of cushion cells with the inflating gas by the collision. The cell chambers of the cushion cells may thus be designed to be connected with one another, so that the total cell chamber volume may be formed for all interconnected cushion cells.

The separate inner volume or the total cell chamber volume of the cell chambers of the plurality of cushion cells may be filled through the second port as a separate fabric channel connected to the inflator, so that the inflating gas filling up the separate second cushion unit may have a differentiated internal pressure when compared to the first cushion unit. For example, it may be beneficial to have a higher level of pressure in the separate volume, namely the total cell chamber volume, of the plurality of cushion cells of the second cushion unit facing the occupant, in order to further add or increase the rigidity to the airbag module and/or contact surface at the region contacting the occupant during the collision.

According to a further example, the cell chamber of the plurality of cushion cells may be connected to the first cushion unit, so that the cell chamber can be filled with the inflating gas by means of the first cushion unit.

Alternatively, the first port may be designed to be the second port and thus act as the common port for both the first cushion unit and the plurality of cushion cells of the second cushion unit. In this way, the separate inner volume of the cell chambers of the plurality of cushion cells may not be filled through the second port as a separate fabric channel connected to the inflator. Accordingly, the inflating gas filling up the separate second cushion unit may have a common internal pressure with the first cushion unit.

According to a second aspect, there is provided a vehicle that comprises an airbag module according to the present disclosure.

According to a third aspect, there is provided a use of an airbag module according to the present disclosure for a vehicle according to the present disclosure for protecting an occupant by a collision.

According to a fourth aspect, there is provided a method for protecting an occupant by a collision by means of an airbag module according to the present disclosure for a vehicle. The method comprises the following steps: first, providing a first cushion unit and a second cushion unit, which comprises a plurality of cushion cells; subsequently, arranging the plurality of cushion cells adjacent to each other; finally, arranging the plurality of cushion cells of the second cushion unit at the first cushion unit for covering a region of the airbag module, which faces an occupant and is in contact with the occupant during a collision.

Additionally, the method may further comprise the step of filling a chamber volume of a chamber of the first cushion unit with the inflating gas via a first port of the first cushion unit by means of an inflator.

Moreover, the method may further comprise the step of filling a cell chamber volume of a cell chamber of each of the plurality of cushion cells of the second cushion unit with the inflating gas by means of the inflator. The total cell chamber volume of the second cushion unit may be filled via a second port, which may be provided separately from the first port. Alternatively, the total cell chamber volume may be filled via the first part as a common port for filling the inflating gas into the chamber of the first cushion unit and the cell chamber of each of the plurality of cushion cells of the second cushion unit. Further, the plurality of cushion cells may be designed to be interconnected with each other, so that all cell chambers of the cushion cells may be filled with the inflating gas together.

The method may be at least partly computer-implemented, and may be implemented in software or in hardware, or in software and hardware. Further, the method may be carried out by computer program instructions running on means that provide data processing functions. The data processing means may be a suitable computing means, such as an electronic control module etc., which may also be a distributed computer system. The data processing means or the computer, respectively, may comprise one or more of a processor, a memory, a data interface, or the like.

It should be noted that the above examples may be combined with each other irrespective of the aspects involved. Accordingly, the method may be combined with structural features and, likewise, the apparatus and the system may be combined with features described above with regard to the method.

These and other aspects of the present disclosure will become apparent from and elucidated with reference to the examples described hereinafter.

BRIEF DESCRIPTION OF DRAWINGS

Examples of the disclosure will be described in the following with reference to the following drawings.

DETAILED DESCRIPTION

The figures are merely schematic representations and serve only to illustrate examples of the disclosure. Identical or equivalent elements are in principle provided with the same reference signs.

Figure 1A:
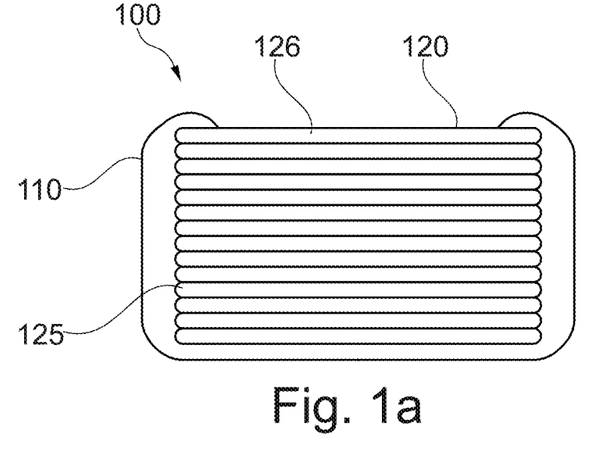
FIG. 1a shows schematically a front view of an example of an airbag module according to the present disclosure.

FIG. 1a shows schematically a front view of an airbag module 100 for a vehicle 10, which comprises a first cushion unit 110 and a second cushion unit 120 that comprises a plurality of cushion cells 125. For example, the airbag module 100 may be a knee airbag cushion that may be integrated in the vehicle 10. The airbag module 100 is also shown in a side view in FIG. 1b with the first cushion unit 110 and the second cushion unit 120 having the plurality of cushion cells 125.

Figure 1B:
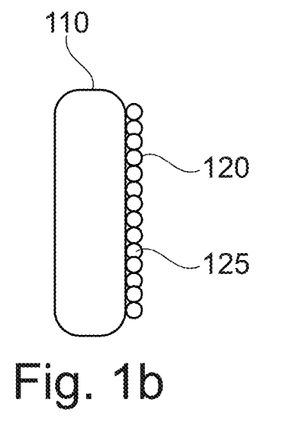
FIG. 1b shows schematically a side view of an example of an airbag module according to the present disclosure.

The plurality of the cushion cells 125 are arranged adjacent to each other, as shown in FIG. 1a and FIG. 1b. For example, each of the plurality of the cushion cells 125 in FIG. 1a is designed to be tube shaped. The plurality of the tube-shaped cushion cells 125 of the second cushion unit 120 are arranged at the first cushion unit 110 and configured to cover a region of the airbag module 100, which may be arranged to face an occupant 50 (shown in FIG. 5) or a body part such as a knee of the occupant 50 and be in contact with the occupant 50 during a collision.

Figure 2A:
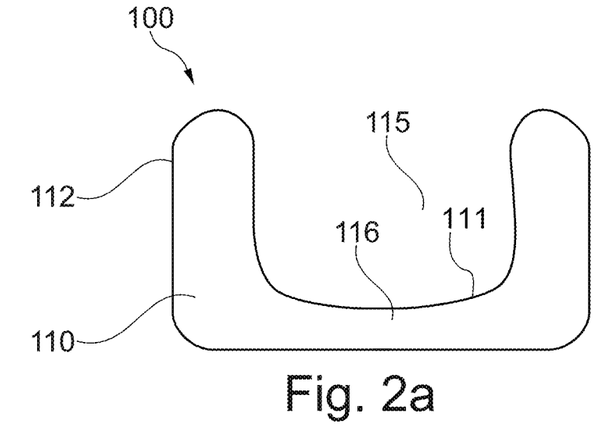
FIG. 2a shows schematically a front view of an example of a first cushion unit of an airbag module in part according to the present disclosure.
Figure 2B:
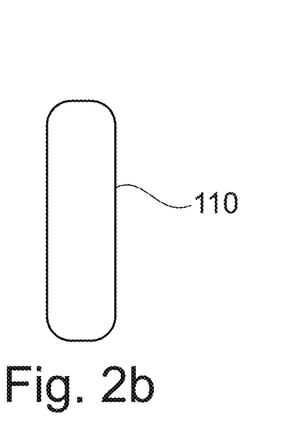
FIG. 2b shows schematically a side view of an example of a first cushion unit of an airbag module in part according to the present disclosure.

FIG. 2a and FIG. 2b further show, respectively, a front view and a side view of the first cushion unit 110 of the airbag module 100, which may be designed to be a substantially U-shaped body member 111 that may comprise a chamber 116 with an internal chamber volume and a pair of arms 112.

Alternatively, the first cushion unit 110 may comprise an aperture 115. The aperture 115 may be designed to form the U-shaped body member 111 of first cushion unit 110. In other words, the first cushion unit 110 may be redefined or reduced in size when adding or assembling the second cushion unit having the plurality of cushion unit with separate volume facing the occupant 50. The minimized first cushion unit 110 may be integrated into a limited packaging volume of the vehicle 10 for providing more roominess to the occupant 50 inside the vehicle 10.

The second cushion unit 120 in FIG. 1 may be arranged to cover the aperture 115 of the first cushion unit 110. Accordingly, each of the plurality of cushion cells 125 may be arranged at and/or connected to the pair of arms of the first cushion unit 110.

The first cushion unit 110 and/or the second cushion unit 120 may be designed to be inflatable. While the first cushion unit 110 may be provided with a chamber 116 having a chamber volume, each of the plurality of cushion cells 125 may comprise a cell chamber 126 having a respective cell chamber volume. The cell chamber volume of each cushion cell 125 may form with the other cell chamber volumes of the plurality of cushion cells a total cell chamber volume as a separate inner volume for the second cushion unit 120. The chamber of the first cushion unit 110 and/or the cell chamber of each of the plurality of cushion cells 125 may be filled with an inflating gas.

The airbag module 100 may further comprise an inflator (not shown), which may be configured to produce the inflating gas for filling the first cushion unit 110 and/or the plurality of the cushion cells 125 of the second cushion unit 120 by the collision.

Figure 4A:
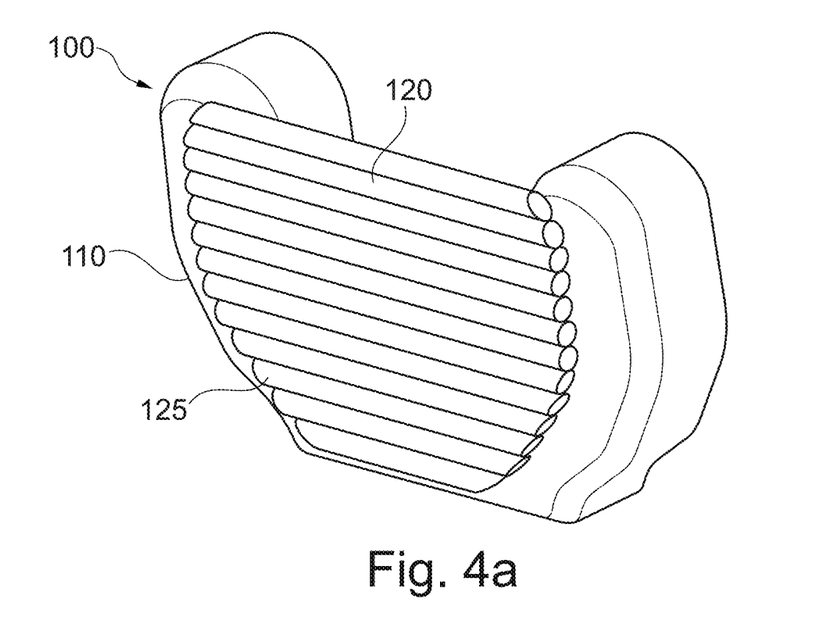
FIG. 4a shows schematically an example of an airbag module according to the present disclosure.
Figure 4B:
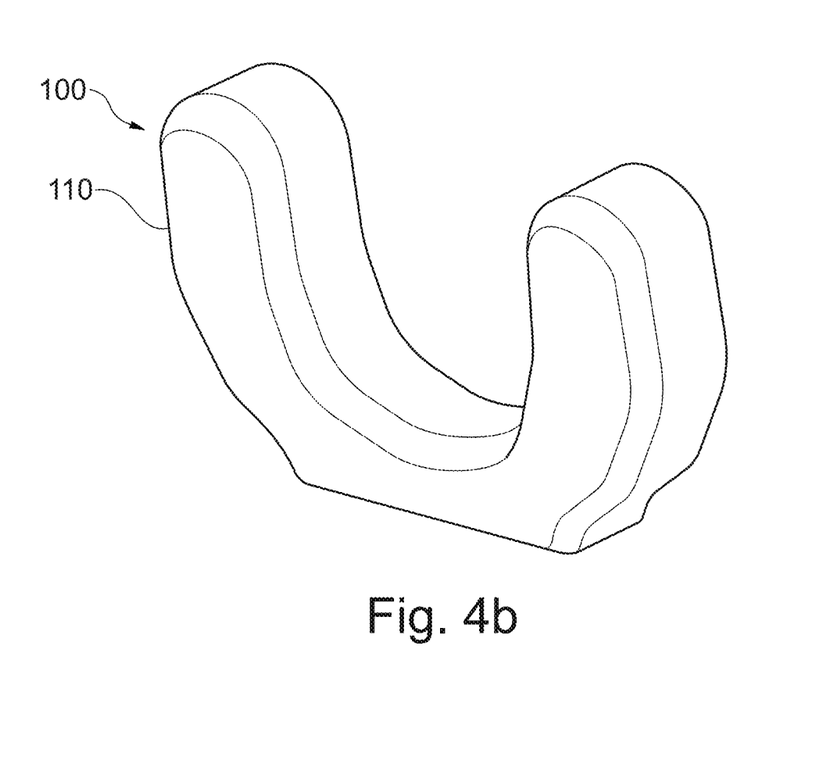
FIG. 4b shows schematically an example of an airbag module in part according to the present disclosure.

FIG. 4a and FIG. 4b may further show, respectively, a perspective or three-dimensional view of the airbag module 100 having the first cushion unit 110 with (FIG. 4a) or without (FIG. 4b) the plurality of cushion cells 125 of the second cushion unit 120 being assembled thereon.

Figure 3A:
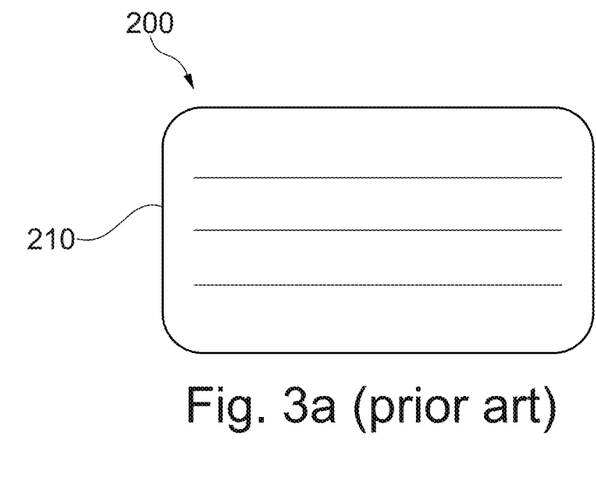
FIG. 3a shows schematically a front view of an example of a conventional airbag module (prior art).
Figure 3B:
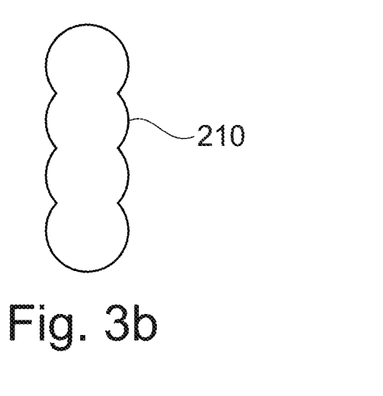
FIG. 3b shows schematically a side view of an example of a conventional airbag module (prior art).

As a comparison, a conventional airbag module 200, as shown in a front view in FIG. 3a and in a side view in FIG. 3b, may comprise a single cushion unit 210. Although, in the side view, the cushion unit 210 of the conventional airbag module 200 may comprise a similar form as the first cushion unit 110 of the airbag module 100 according to the present disclosure, the airbag module 100 according to the present disclosure may be reduced in size or at least maintained at the same level, since the chamber volume of the first cushion unit 110 may be drastically redefined or minimized to a degree where a large portion, such as the aperture 115 of the first cushion unit 110, may be removed. However, more total inner volume of the inflating gas may need to be filled by means of the inflator, respectively, into the chamber 116 of the first cushion unit 110 and all cell chambers 126 of the plurality of cushion cells 125 of the second cushion unit 120.

In order to fill the inflating gas into the air bag module 100, the first cushion unit 110 may comprise a first port, which may be configured to allow the inflator filling the chamber volume of the chamber 116 with the inflating gas. Additionally, the cell chamber 126 may comprise a second port, which may be connected to the inflator separately and configured to allow the inflator filling the cell chamber volume of the cell chamber 126 of the plurality of cushion cells 125. The second port may be a common port for all cushion cells 125 of the second cushion unit 120. Moreover, the plurality of cushion cells 125 may be interconnected with each other, so that the cell chamber 126 of each of the plurality of cushion cells 125 can be filled with the inflating gas via the second port.

Alternatively, the first port may also be designed to be the second port. As a common port for the whole airbag module, the cell chamber 126 of the plurality of cushion cells 125 may be connected to the first cushion unit 110, so that the cell chamber 126 can be filled with the inflating gas via the common port or the first port of the first cushion unit 110.

Figure 5:
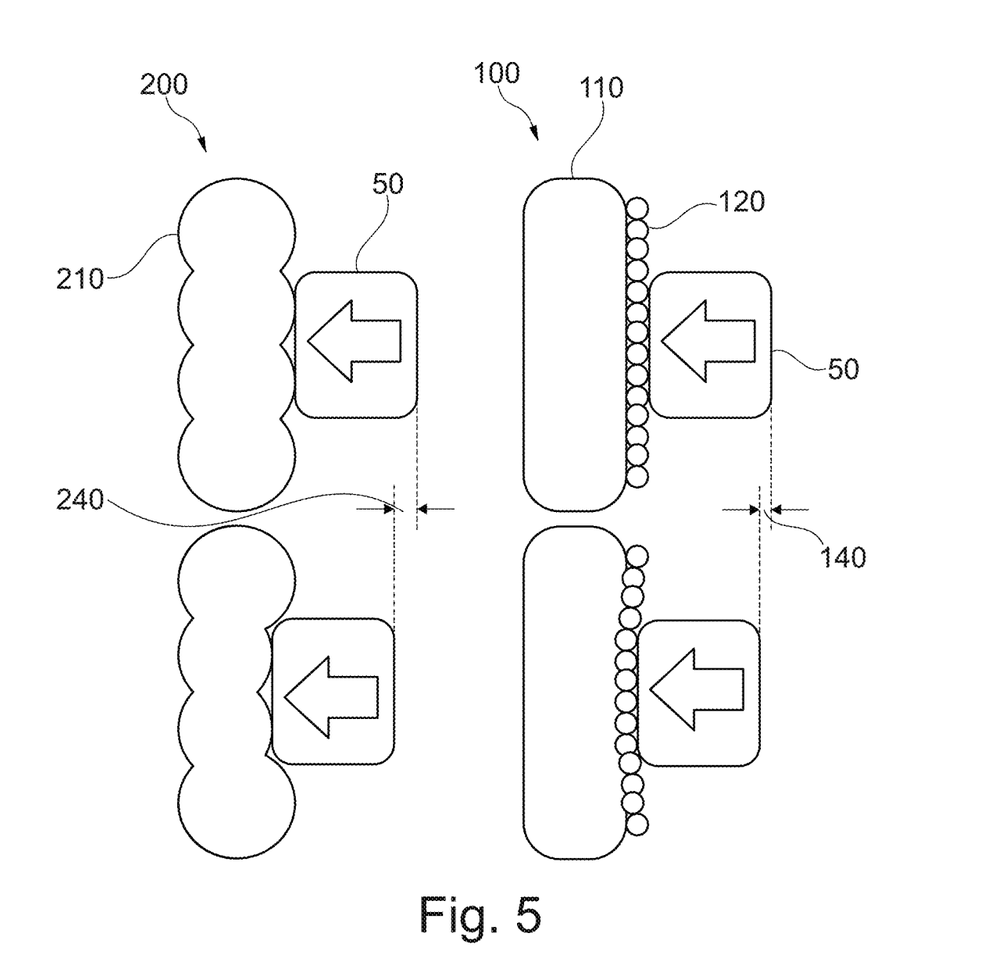
FIG. 5 shows schematically an example of an airbag module by a collision according to the present disclosure in comparison with an airbag module (prior art).

FIG. 5 shows that, by the collision of the vehicle 10 with an occupant 50, the plurality of cushion cells 125 of the second cushion unit 120 may be configured to allow the region of the airbag module 100 being deformed over a predefined distance by the collision. In contrast, when the occupant 50 or a body part of the occupant 50 is acting into the conventional airbag module 200 with a certain force, the conventional airbag module 200 may be deformed or compressed by a certain collision distance 240. The predefined distance 140 may be smaller than the collision distance 240 of the conventional airbag module 200, as the added contact surface by the plurality of cushion cells 125 of the second cushion unit 120 may result in a reduced compression or deformation when applying a constant force at the region of the airbag module 100 according to the present disclosure by the collision.

As the added cell chamber volume may further act as a mean for increasing the contact surface as a semi-rigid surface at the region between the occupant 50 and the airbag module 100 while restraining the performance without increasing the power of the inflator, the plurality of cushion cells 125 may be configured to allow compressing the chamber 116 of the first cushion unit 110 by a reduced chamber volume and/or the cell chamber 126 of each of the plurality of cushion cells 125 of the second cushion unit 120 by a reduced cell chamber volume by the collision. This may further result in the reduction of the amount of the total compression of the airbag module 100.

Figure 6:
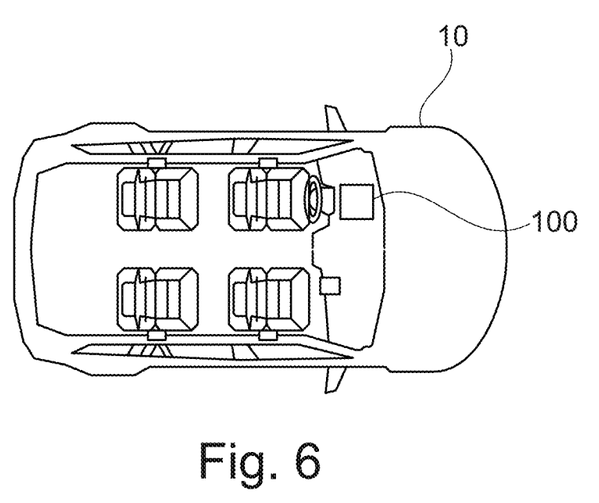
FIG. 6 shows schematically an example of a vehicle according to the present disclosure.

FIG. 6 shows the vehicle 10 that comprises an airbag module 100 according to the present disclosure.

Figure 7:
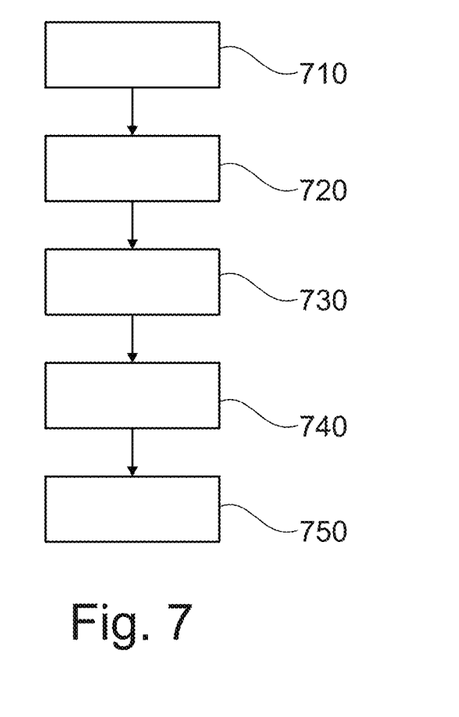
FIG. 7 shows schematically a flow chart illustrating a method for protecting an occupant by a collision by means of an airbag module for a vehicle according to the present disclosure.

FIG. 7 shows a flow chart illustrating a method for protecting an occupant 50 by a collision by means of an airbag module 100 for a vehicle 10. The method starts at step 710 where a first cushion unit 110 and a second cushion unit 120, which comprises a plurality of cushion cells 125, are provided.

At a subsequent step 720, the plurality of cushion cells 125 are arranged adjacent to each other, so that the second cushion unit 120 may be formed.

At a further step 730, the plurality of the cushion cells 125 of the second cushion unit 120 may be arranged at the first cushion unit 110 for covering a region of the airbag module 100, which may face the occupant 50 and be in contact with the occupant 50 during a collision.

At a further step 740, a chamber volume of a chamber 116 of the first cushion unit 110 may be filled with the inflating gas via a first port of the first cushion unit 110 by means of an inflator.

Furthermore, at a further step 750, a cell chamber volume of a cell chamber of each of the plurality of cushion cells 125 of the second cushion unit 120 may be filled with the inflating gas by means of the inflator. The total cell chamber volume of the second cushion unit 120 may be filled via a second port, which may be provided separately from the first port. Alternatively, the total cell chamber volume may be filled via the first part as a common port for filling the inflating gas into the chamber 116 of the first cushion unit 110 and the cell chamber of each of the plurality of cushion cells 125 of the second cushion unit 120. Moreover, the plurality of cushion cells 125 may be designed to be interconnected with each other, so that all cell chambers of the cushion cells 125 may be filled with the inflating gas simultaneously.

Other variations to the disclosed examples can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

LIST OF REFERENCE SIGNS 10 vehicle
50 occupant
100 airbag module
110 first cushion unit
111 body member
112 pair of arms
115 aperture
116 chamber
120 second cushion unit
125 plurality of cushion cells
126 cell chamber
140 predefined distance
200 convention airbag module
210 cushion unit
240 collision distance
710 step of providing a first cushion unit and a second cushion unit
720 step of arranging a plurality of cushion cells adjacent to each other
730 step of arranging the plurality of cushion cells of the second cushion unit at the first cushion unit for covering a region of the airbag module
740 step of filling a chamber volume of a chamber with the inflating gas via a first port by means of an inflator
750 step of filling a cell chamber volume of a cell chamber of each of the plurality of cushion cells with the inflating gas by means of the inflator

What is claimed is:

1. An airbag module for a vehicle, comprising:
a first cushion unit, wherein the first cushion unit is a substantially U-shaped body member comprising:
a pair of arms,
an aperture between the pair of arms, and
a chamber with a chamber volume; and
a second cushion unit comprising a plurality of cushion cells,
wherein the plurality of cushion cells are arranged adjacent to each other on a surface of the first cushion unit,
wherein the plurality of cushion cells are configured to cover a region of the airbag module,
wherein the region is arranged to face an interior space of the vehicle configured to carry one or more occupants,
wherein each of the plurality of cushion cells are connected at each end of the cushion cell to a respective arm of the pair of arms, and
wherein the plurality of cushion cells are further configured to form an intermediate layer between the first cushion unit and any occupant body part located at the region during a collision.

2. The airbag module of claim 1, wherein each of the plurality of cushion cells is tube shaped.

3. The airbag module of claim 1, wherein the second cushion unit is arranged to cover the aperture of the first cushion unit.

4. The airbag module of claim 1, wherein at least one of the first cushion unit or the second cushion unit is inflatable.

5. The airbag module of claim 1,
wherein each of the plurality of cushion cells comprises a cell chamber, and
wherein the cell chamber of each of the plurality of cushion cells comprises a cell chamber volume when being filled with an inflating gas.

6. The airbag module of claim 5, wherein at least one of:
the plurality of cushion cells are further configured to allow the region of the airbag module to be deformed over a predefined distance by the collision,
the plurality of cushion cells are further configured to allow compressing the chamber of the first cushion unit by a reduced chamber volume by the collision; or
the plurality of cushion cells are further configured to allow compressing the cell chamber of each of the plurality of cushion cells of the second cushion unit by a reduced cell chamber volume by the collision.

7. The airbag module of claim 5, further comprising:
an inflator, wherein the inflator is configured to produce the inflating gas for filling at least one of the first cushion unit or the plurality of cushion cells of the second cushion unit.

8. The airbag module of claim 7,
wherein the first cushion unit comprises a first port, and
wherein the first port of the first cushion unit is connected to the inflator and is configured to allow the inflator to fill the chamber volume of the chamber with the inflating gas.

9. The airbag module according to claim 8,
wherein the cell chamber of each of the plurality of cushion cells is connected to the first cushion unit, and
wherein the cell chamber of each of the plurality of cushion cells is fillable with the inflating gas by the first cushion unit.

10. The airbag module of claim 7,
wherein the cell chamber of a cushion cell of the plurality of cushion cells comprises a second port, and wherein the second port is connected to the inflator and is configured to allow the inflator to fill the cell chamber volume of the cell chamber of the cushion cell of the plurality of cushion cells.

11. The airbag module of claim 10,
wherein the plurality of cushion cells are interconnected with each other, and
wherein the cell chamber of each of the plurality of cushion cells is fillable with the inflating gas by means of the second port.

12. A vehicle, comprising:
an airbag module, comprising:
a first cushion unit, wherein the first cushion unit is a substantially U-shaped body member comprising:
a pair of arms,
an aperture between the pair of arms, and
a chamber with a chamber volume; and
a second cushion unit comprising a plurality of cushion cells,
wherein the plurality of cushion cells are arranged adjacent to each other on a surface of the first cushion unit,
wherein the plurality of cushion cells are configured to cover a region of the airbag module,
wherein the region is arranged to face an interior space of the vehicle configured to carry one or more occupants,
wherein each of the plurality of cushion cells are connected at each end of the cushion cell to a respective arm of the pair of arms, and
wherein the plurality of cushion cells are further configured to form an intermediate layer between the first cushion unit and any occupant body part located at the region during a collision.

13. The vehicle of claim 12, wherein the airbag module protects the one or more occupants of the vehicle during the collision.

14. The vehicle of claim 12, wherein each of the plurality of cushion cells is tube shaped.

15. The vehicle of claim 12, wherein the second cushion unit is arranged to cover the aperture of the first cushion unit.

16. The vehicle of claim 12, wherein at least one of the first cushion unit or the second cushion unit is inflatable.

17. The vehicle of claim 12,
wherein each of the plurality of cushion cells comprises a cell chamber, and
wherein the cell chamber of each of the plurality of cushion cells comprises a cell chamber volume when being filled with an inflating gas.

18. A method for protecting one or more occupants of a vehicle during a collision via an airbag module of the vehicle, the method comprising:
providing the airbag module comprising a first cushion unit and a second cushion unit, the second cushion unit comprising a plurality of cushion cells, and the first cushion unit being a substantially U-shaped body member comprising:
a pair of arms,
an aperture between the pair of arms, and
a chamber with a chamber volume; and
arranging the plurality of cushion cells adjacent to each other on a surface of the first cushion unit, wherein each of the plurality of cushion cells are connected at each end of the cushion cell to a respective arm of the pair of arms, wherein the arranging comprises arranging the plurality of cushion cells of the second cushion unit to:
cover a region of the airbag module that faces an interior space of the vehicle configured to carry one or more occupants, and
form an intermediate layer between the first cushion unit and any occupant body part located at the region during the collision.

19. The method of claim 18, wherein at least one of the first cushion unit or the second cushion unit is inflatable.

20. The method of claim 18,
wherein each of the plurality of cushion cells comprises a cell chamber, and
wherein the cell chamber of each of the plurality of cushion cells comprises a cell chamber volume when being filled with an inflating gas.

* * * * *